US010976206B2

(12) United States Patent
Interdonato

(10) Patent No.: US 10,976,206 B2
(45) Date of Patent: Apr. 13, 2021

(54) DEVICE FOR MEASURING THE PRELOADING OF A SCREW IN A PARTICULAR JOINT

(71) Applicant: ATLAS COPCO INDUSTRIAL TECHNIQUE AB, Stockholm (SE)

(72) Inventor: Attilio Alessandro Interdonato, Paderno Dugnano (IT)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 0 days.

(21) Appl. No.: 16/500,956

(22) PCT Filed: Apr. 5, 2018

(86) PCT No.: PCT/IB2018/052357
§ 371 (c)(1),
(2) Date: Oct. 4, 2019

(87) PCT Pub. No.: WO2018/185697
PCT Pub. Date: Oct. 11, 2018

(65) Prior Publication Data
US 2020/0033208 A1    Jan. 30, 2020

(30) Foreign Application Priority Data

Apr. 6, 2017  (IT) .................... 102017000037860

(51) Int. Cl.
*G01L 1/00* (2006.01)
*G01L 1/22* (2006.01)
*F16N 11/00* (2006.01)
*G01L 5/24* (2006.01)

(52) U.S. Cl.
CPC ............ *G01L 1/2262* (2013.01); *F16N 11/00* (2013.01); *G01L 5/24* (2013.01); *F16N 2210/00* (2013.01)

(58) Field of Classification Search
CPC .......... G01L 1/2262; G01L 5/24; F16N 11/00; F16N 2210/00
USPC ...................................... 73/862.628
See application file for complete search history.

(56) References Cited

U.S. PATENT DOCUMENTS

| 10,330,063 B2 * | 6/2019 | Bernhaupt ............. F02M 61/20 |
| 2003/0145657 A1 | 8/2003 | Engler |
| 2004/0079160 A1 * | 4/2004 | Aston ..................... G01L 1/127 |
| | | 73/753 |

(Continued)

FOREIGN PATENT DOCUMENTS

| DE | 102011075859 A1 | 11/2012 |
| WO | 03021115 A1 | 3/2003 |

OTHER PUBLICATIONS

International Search Report for corresponding application PCT/IB2018/052357 filed Apr. 5, 2018; Report dated May 28, 2018.

(Continued)

*Primary Examiner* — Max H Noori
(74) *Attorney, Agent, or Firm* — Cantor Colburn LLP

(57) ABSTRACT

A device for measuring the preloading of a screw during a screwing operation including a container body in which a support is inserted, inside which there is a leadscrew into which such screw is screwed by a tightening tool, at the bottom of such support and connected thereto a transducer being arranged, capable of measuring the traction generated on itself as a result of the compression created by the screwing of the screw into the leadscrew.

11 Claims, 4 Drawing Sheets

(56) References Cited

U.S. PATENT DOCUMENTS

| | | | |
|---|---|---|---|
| 2008/0011129 A1* | 1/2008 | Weimer | B23P 19/067 81/470 |
| 2008/0314577 A1 | 12/2008 | Adamek | |
| 2010/0162829 A1 | 7/2010 | Chiapuzzi | |
| 2016/0245733 A1* | 8/2016 | Cerutti | G01N 3/38 |

OTHER PUBLICATIONS

Written Opinion for corresponding application PCT/IB2018/052357 filed Apr. 5, 2018; Report dated May 28, 2018.
EP Examination report dated Jul. 15, 2020 re: Application No. 18 721 148.7-1001, pp. 1-4, citing: US 2010/0162829 A1 and US 2008/0314577 A1.

* cited by examiner

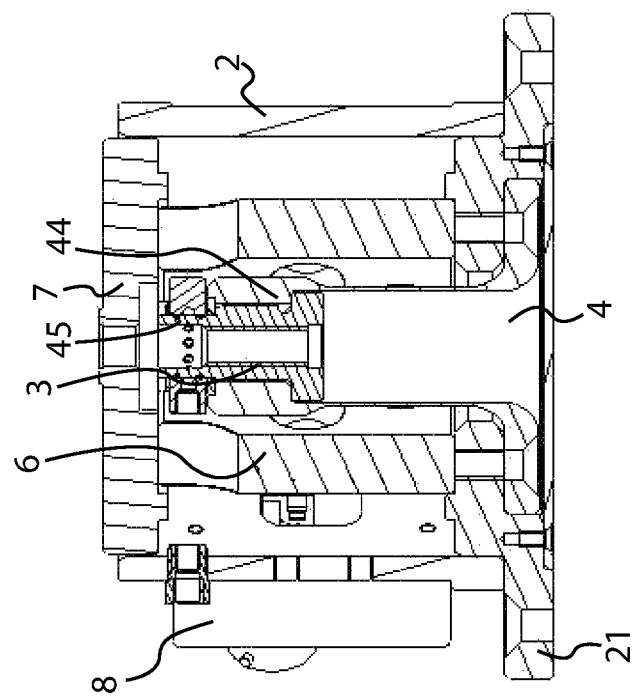
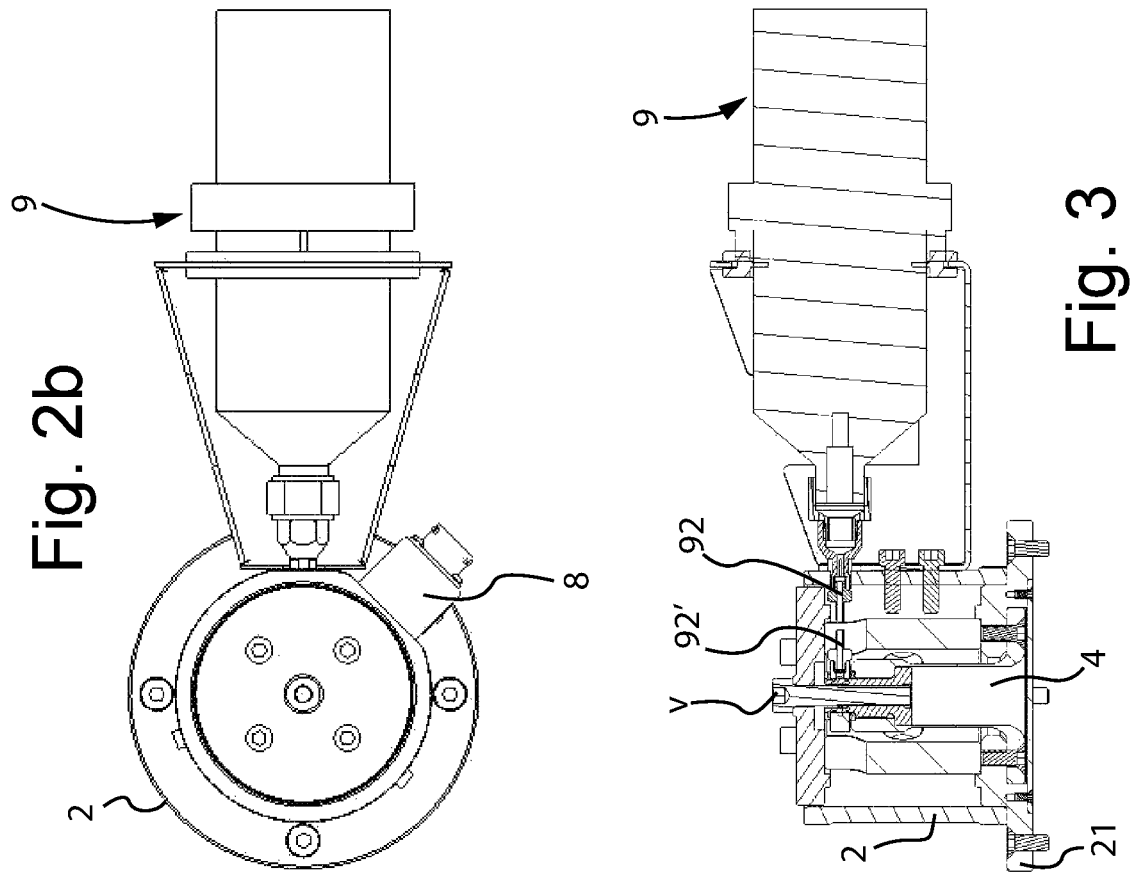

DEVICE FOR MEASURING THE PRELOADING OF A SCREW IN A PARTICULAR JOINT

TECHNICAL FIELD

The present disclosure relates to a device for measuring the preloading of a screw in a particular joint.

BACKGROUND

Such screw may be screwed by means of a tightening tool such as for example, an industrial screwdriver, a dynamometric wrench, etc.

The quality of the tool that performed the operation may be determined by measuring the load the screw is subjected to during the screwing.

The assessment of the quality of a tightening tool is a highly felt problem; electronic devices for measuring the characteristics of industrial screwdrivers comprising sensors adapted to measure parameters such as torque, force, angle, length and combinations of the aforesaid parameters, are made for such an object. A field of application of such devices is the one of testing the tightening behaviour of industrial screwdrivers by means of measuring the rotating and/or braking torque of the rotating shaft. Indeed, the test of a screwdriver is a procedure that involves carrying out a tightening sequence for which torque and angle are measured.

Testing the quality of a screwdriver by means of measuring such parameters however at times is not very accurate and is affected by errors, in particular on the uniformity of the behaviour of the brakes that simulate the screw or the bolt that the screwdriver is to tighten.

Therefore, to improve such assessment on the tightening tool, the effects of such tightening on a screw may be assessed by measuring the characteristics thereof. In particular, the tensile force exerted on a transducer in which the screw is inserted during the tightening, is measured on the screw. In particular, such tensile stress is generated on a leadscrew constrained to the transducer as a reaction to the compression created by the screwing of the screw itself.

BRIEF SUMMARY

One aspect of the present disclosure relates to a device for measuring the preloading of a screw in a particular joint.

BRIEF DESCRIPTION OF THE DRAWINGS

Further advantages of the present disclosure shall be apparent from the description below and from the accompanying drawings provided purely by mere way explanatory and non-limiting example, in which:

FIGS. 2a and 2b illustrate the device of FIG. 1 in side view and top view, respectively;

FIG. 3 illustrates the device of FIG. 1 in a longitudinal section;

FIG. 5 illustrates the device of FIG. 1 in section without the greasing mechanism;

DETAILED DESCRIPTION

Figure 1:
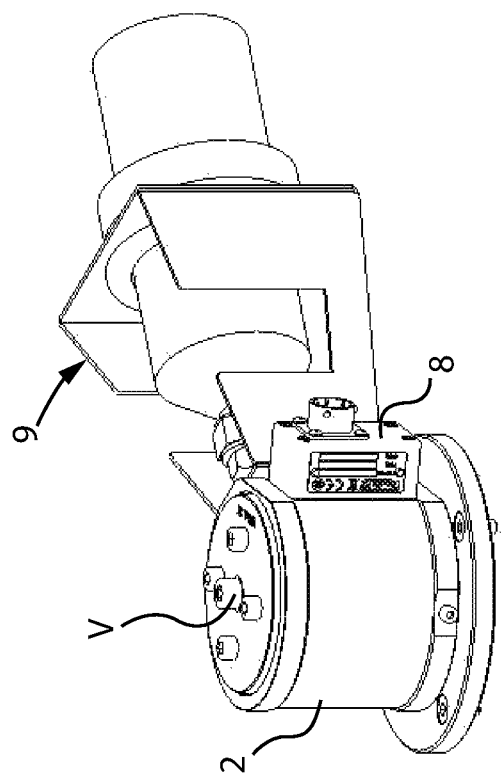
FIG. 1 depicts a perspective view of the device according to the present disclosure.
Figure 2A:
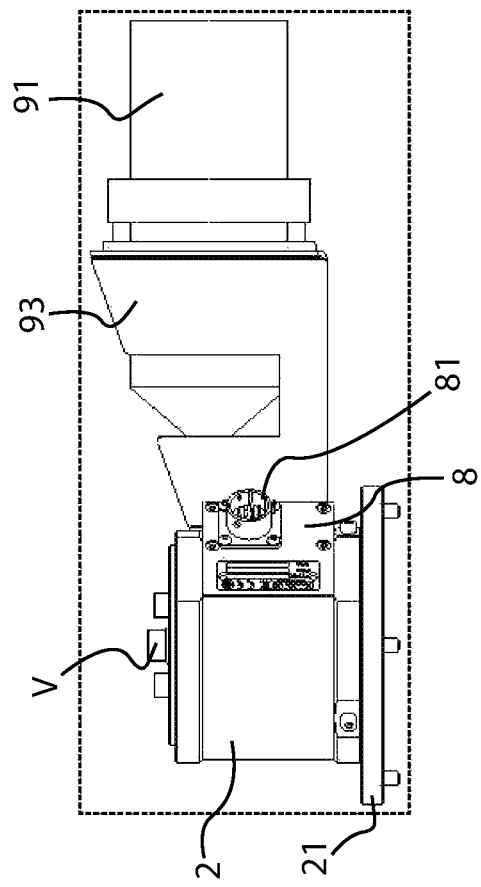
Figure 7:
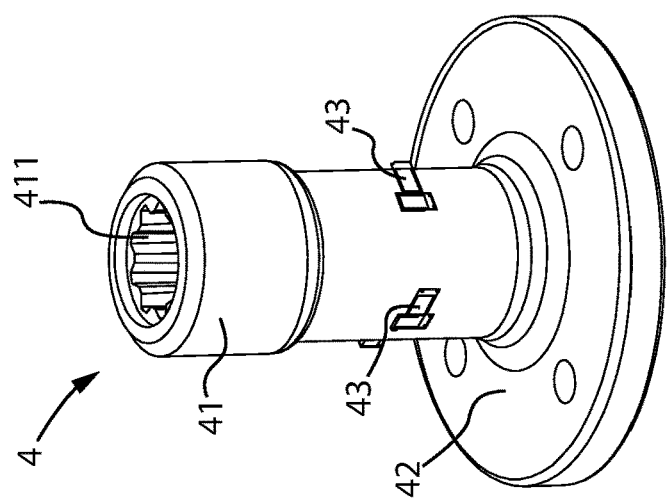
FIG. 7 illustrates the transducer of the device of FIG. 1 in perspective view.
Figure 6:
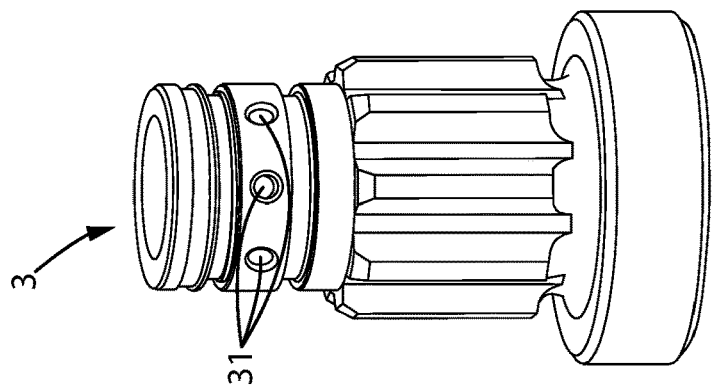
FIG. 6 illustrates the leadscrew of the device of FIG. 1 in perspective view.
Figure 4:
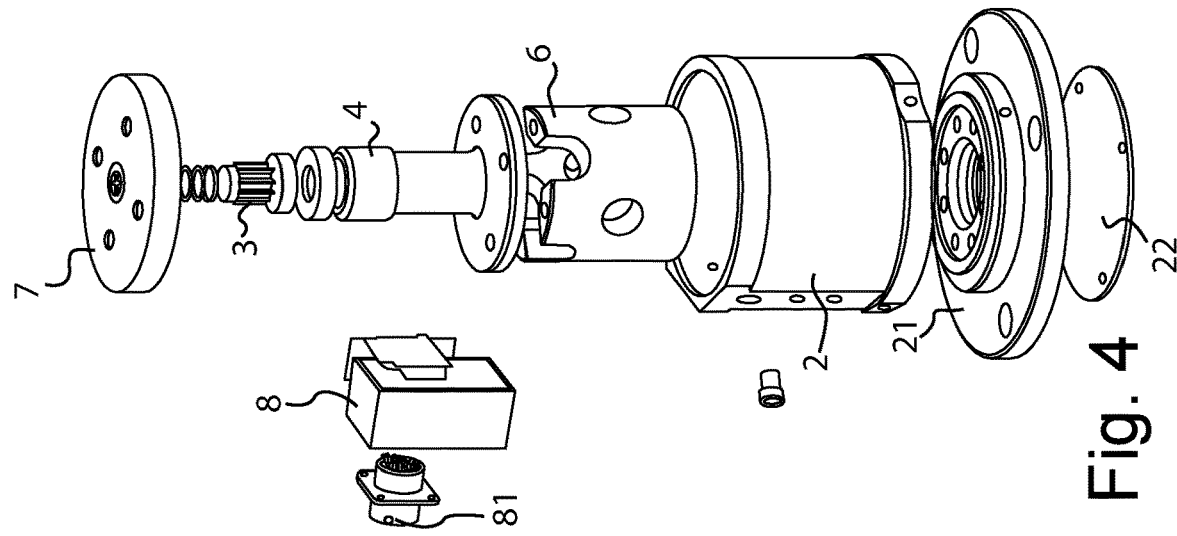
FIG. 4 illustrates the device of FIG. 1 in exploded view.
Figure 9:
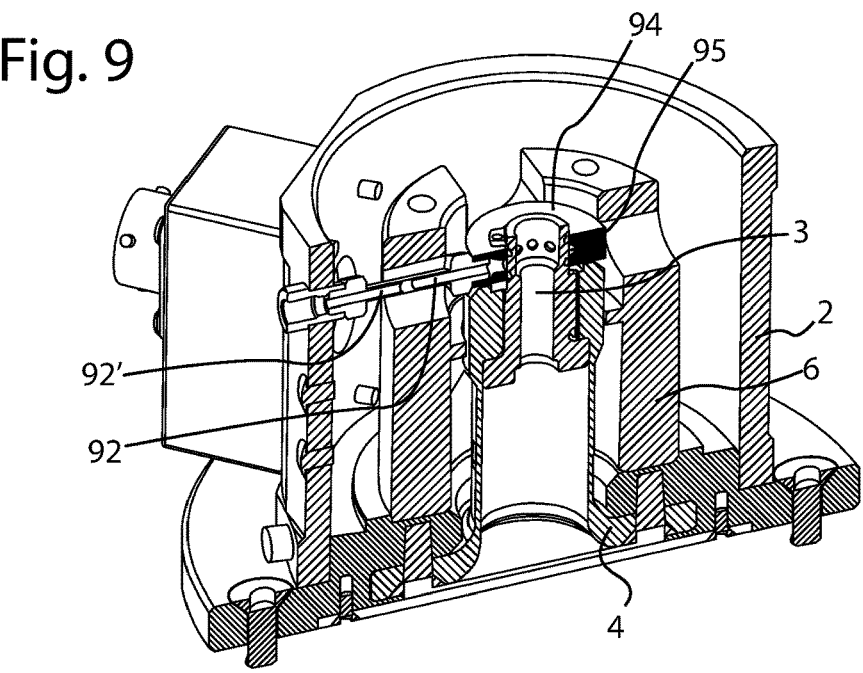
FIG. 9 illustrates a cut-out view of the device.

With reference to the mentioned drawings, the device according to the present disclosure comprises a container body 2 in which a support 3 is inserted, inside which there is a leadscrew into which a screw V is screwed by means of a tightening tool (not shown).

At the bottom of such support and connected thereto is a transducer 4 that is capable of measuring the traction generated on itself as a result of the compression created by the screwing of the screw into the leadscrew.

The aforesaid transducer comprises a preferably cylindrical upper portion 41 joined to a base disc 42. Such base is associated with a specific seat with a corresponding base 21 of the container body 2, provided with a closing and constraining bottom 22.

In the embodiment illustrated, the whole structure has a substantially cylindrical section, but the section of the transducer, the base, the external casing may equally have different sections.

The base 21 of the container body has a larger diameter than the one of the container body 2 so as to define an external ring for fixing the device on a specific test bench.

The cylindrical portion has an upper cavity 411 to which the support of the leadscrew 3 is associated.

The support of the leadscrew 3 is positioned inside the transducer 4, causing it to pass from the bottom. The shoulder 44 inside the transducer and shown in the figure prevents the leadscrew 3 from moving upwards. A retaining ring 45 prevents the leadscrew 3 from falling downwards. The rotary movement of the leadscrew 3 is adjusted by the grooved profile obtained on the external surface thereof and on the internal surface of the transducer 4.

At least one sensor 43 capable of sensing the tensile stress undergone by the transducer is provided on the lateral surface of the cylindrical portion. Indeed, when the screw is screwed into the leadscrew, it causes an upwards tensile stress also to the cylindrical portion of the transducer due to the fact that it is constrained to the support of the leadscrew, while the base disc thereof is constrained to the base of the container body.

The traction is measured by the aforesaid sensor, which is a resistive sensor.

The resistances are positioned so as to create a Wheatstone bridge that allows sensing a signal as electric imbalance of the bridge itself.

The cylindrical upper portion of the transducer is inserted in a tubular body 6 housed inside the container body and closed by a cover 7 that is perforated at the top in order to insert the test screw T into the underlying leadscrew. The cover 7 and the tubular body 6 are very important because their contact causes the rigidity of the joint to be tested.

The device further comprises an electronic board 8 for managing the signals sensed by such sensor. Such board also comprises an input/output socket 81 for a transmission cable.

Such socket may be a typical multipole-board female connector with military type silver contacts.

The screws may be classified with an identifier M and a number (for example M6, M8, M10, M12, M . . . ).

According to one aspect of the present disclosure, the configuration of the device allows appropriately sizing the mechanical parts, testing screws also having very different sizes like the ones indicated above, without modifying the sensor and electronic part of the device.

The device further comprises a greasing system 9 that can be directly constrained to the device or it can be provided separately and connected thereto by means of an appropriate pipe. Such greasing system comprises a refillable reservoir 91 provided at an end thereof with a pair of (internal 92 and external 92') injectors for the emission of lubricant into the leadscrew of the device.

In the version illustrated, the reservoir is constrained to the body of the device by means of a bracket 93.

The internal injector 92 is fixed on a neck ring 94 held in position around the leadscrew 3. The neck ring has a side hole for housing the injector and an internal groove 95. The grease is under pressure, enters the hole and moves along the groove 95. The groove is at the same height as the holes 31 of the leadscrew 3. The grease being under pressure, it is capable of passing from the groove to the holes 31 so as to lubricate the leadscrew and the screw during the screwing/unscrewing step.

Figure 8:
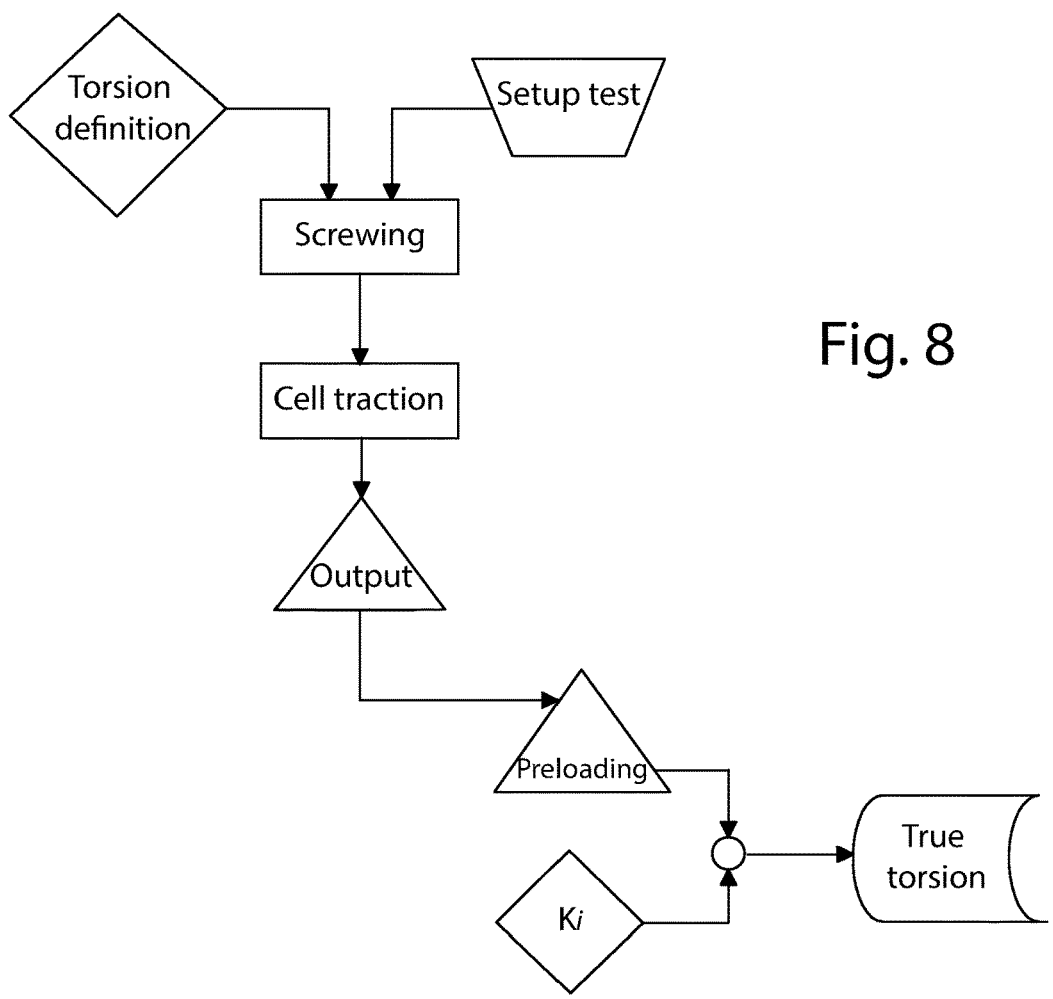
FIG. 8 illustrates the flow algorithm of a tightening test.

FIG. 8 shows the flowchart relative to the procedure for using the device. The preloading (or torsion) value to be applied to the screw is defined during the setup step. Once screwing is complete, the transducer sends the signal to the data acquisition device. Such signal provides the preloading sensed by the transducer which is multiplied by a coefficient Ki representative of the friction and rigidity coefficient of the tested joint to obtain information on the true torsion applied to the system.

The invention claimed is:

1. Device for measuring the preloading of a screw during a screwing operation comprising:
    a container body in which a support is inserted, inside which there is a leadscrew in which said screw is screwed by means of a tightening tool, at a bottom of said support and connected thereto a transducer being arranged, capable of measuring traction generated on itself as a result of compression created by the screwing of the screw in the leadscrew, and
    a greasing system for the leadscrew and the screw that can be directly constrained to the device or it can be provided separately and connected thereto by means of an appropriate pipe, said system comprising a refillable reservoir provided at an end thereof with a pair of internal and external injectors for the emission of lubricant in the leadscrew of the device.

2. Device according to claim 1, wherein said transducer comprises a cylindrical upper portion joined to a base disc and associated to a corresponding base of the container body.

3. Device according to claim 2, wherein on a lateral surface of the cylindrical portion at least a sensor is provided, capable of sensing a tensile stress sustained by the cylindrical portion of the transducer.

4. Device according to claim 2, wherein the base has a larger diameter than that of the container body so as to define an external ring for fixing the device on an appropriate test stand.

5. Device according to claim 2, wherein the cylindrical portion of the transducer has an upper cavity to which the support of the leadscrew is associated.

6. Device according to claim 3, wherein such sensor is a resistive Wheatstone bridge sensor.

7. Device according to claim 2, wherein the cylindrical upper portion of the transducer is inserted in a tubular body housed inside the container body and closed by a cover that is perforated at a top in order to insert the test screw in the underlying leadscrew.

8. Device according to claim 2, further comprising an electronic board to manage the signals sensed by said sensor.

9. Device according to claim 8, wherein said board also comprises an input/output socket for a transmission cable.

10. Device according to claim 1, wherein the reservoir is constrained to the body of the device by means of a bracket.

11. Device according to claim 10, wherein the internal injector is fixed on a neck ring held in position around the leadscrew, the neck ring has a side hole in order to house the internal injector and an internal groove, the grease under pressure enter through the hole and moves along the groove, the groove being at a same height of the holes of the leadscrew.

* * * * *